United States Patent [19]

Takano et al.

[11] Patent Number: 4,922,360

[45] Date of Patent: May 1, 1990

[54] MAGNETIC HEAD

[75] Inventors: Hisashi Takano, Hachioji; Naoki Koyama, Kokubunji; Isamu Yuito, Hachioji; Kazuo Shiiki, Kanagawa; Hideo Tanabe, Higashimurayama, all of Japan

[73] Assignee: Hitachi, Ltd., Tokyo, Japan

[21] Appl. No.: 249,306

[22] Filed: Sep. 21, 1988

[30] Foreign Application Priority Data

Sep. 24, 1987 [JP] Japan .................................. 62-237135

[51] Int. Cl.$^5$ .............................................. G11B 5/39
[52] U.S. Cl. .................................................. 360/113
[58] Field of Search ................ 360/113; 324/207, 208, 324/252; 338/32 R

[56] References Cited

FOREIGN PATENT DOCUMENTS 59-121616  7/1984  Japan .
62-110615  5/1987  Japan .

Primary Examiner—Robert S. Tupper
Attorney, Agent, or Firm—Antonelli, Terry & Wands

[57] ABSTRACT

A magnetic head includes a magnetoresistance element having the form of a loop and provided with a gap at a first portion opposite to a second portion confronting a magnetic recording medium, a coil conductor formed around the first portion of the magnetoresistance element for applying a bias magnetic field to the second portion of the magnetoresistance element in the direction of width of a track on the magnetic recording medium, and a lead conductor attached to the magnetoresistance element to cause a current which is necessary for detecting a signal recorded on the magnetic recording medium, to flow through the second portion of the magnetoresistance element, and formed together with the coil conductor as one body so that a part of a current supplied to the lead conductor flows through the coil conductor.

5 Claims, 3 Drawing Sheets

MAGNETIC FIELD APPLIED TO MAGNETORESISTANCE ELEMENT

MAGNETIC FIELD APPLIED TO MAGNETORESISTANCE ELEMENT

MAGNETIC HEAD

BACKGROUND OF THE INVENTION

The present invention relates to a magnetic head for carrying out high density magnetic recording, and more particularly to a magnetic head provided with a magnetoresistance element which has low Barkhausen noise and can produce a high signal-to-noise ratio.

A magnetic head provided with a magnetoresistance element which has the form of a loop and is applied with a bias magnetic field, is described in, for example, a Japanese patent application No. JP-A-59-121616. In this magnetic head, lead wires for generating the bias magnetic field in directions parallel to and perpendicular to a magnetic recording medium, have to be formed at two positions. Hence, the fabricating process of the magnetic head is complicated. Usually, magnetic domains are formed in edge portions of the magnetoresistance element having the form of a loop. In the above magnetic head, the whole of that side of the looped magnetoresistance element which confronts the magnetic recording medium, corresponds to the track width of the magnetic head, and hence the formation of magnetic domains causes Barkhausen noise.

Another magnetic head, in which a bias magnetic field is applied to a magnetoresistance element in the direction of easy magnetization thereof to prevent the generation of Barkhausen noise, is described in a Japanese patent application No. JP-A-62-110615. However, this magnetic head employs the magnetoresistance element having the form of a strip. Accordingly, in order to form a coil around the magnetoresistance element so that the bias magnetic field is applied thereto, the magnetic head is required to have a yoke type structure. The magnetic head having the yoke type structure is lower in reproduced output and smaller in resolution than a magnetic head provided with a magnetoresistance element which is exposed to a gap between the magnetic head and a magnetic recording medium.

SUMMARY OF THE INVENTION

It is an object of the present invention to provide a magnetic head which can be readily fabricated, and can prevent the generation of Barkhausen noise without reducing the reproduced output from the magnetic head and the resolution thereof.

In order to attain the above object, according to the present invention, there is provided a magnetic head, in which a magnetoresistance element has the form of a loop, and a portion of the magnetoresistance element other than the air bearing surface thereof is excited by a coil formed of a part of a lead wire, to apply a bias magnetic field to the sensing area of the magnetoresistance element in the direction of easy axis.

In more detail, in a magnetic head according to the present invention, a magnetoresistance element has the form of a loop, and a gap is formed in a portion of the magnetoresistance element opposite to the air bearing surface (that is, sensing area) thereof. Hence, a current supplied to the magnetoresistance element flows through only the sensing area, and thus there is no fear of reducing the reproduced output. Further, a coil for applying a bias magnetic field to the magnetoresistance element is formed of a portion of the lead wire so that a part of the current supplied to the magnetoresistance element flows through the coil, and hence it is easy to fabricate the magnetic head.

In the magnetic head according to the present invention, the bias magnetic field in the direction of easy axis of the magnetoresistance element can be efficiently generated, by making the length of the gap formed in the magnetoresistance element very small. Further, the bias magnetic field can be efficiently applied to the sensing area of the magnetoresistive element by increasing the thickness of all the portions of the magnetoresistance elements other than the sensing area.

DESCRIPTION OF THE PREFERRED EMBODIMENTS

Now, embodiments of the present invention will be explained below, with reference to the drawings.

Figure 1:
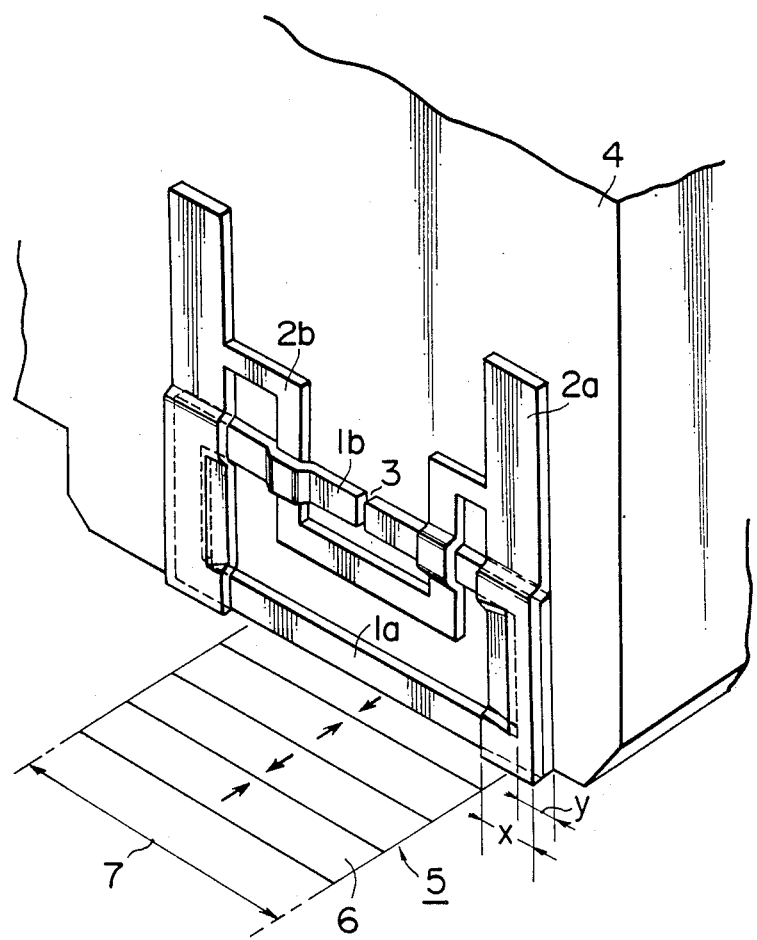
FIG. 1 is a schematic diagram showing an embodiment of a magnetic head according to the present invention.

FIG. 1 is a schematic, perspective view showing an embodiment of a magnetic head according to the present invention.

Referring to FIG. 1, a magnetoresistance element 1a and 1b has the form of a loop, is made of a Ni-Fe alloy, and has a thickness of 400 Å. A side 1a of the magnetoresistance element is formed on an end portion of a slider 4 so that the side 1a confronts a magnetic recording medium 5 and is parallel to the direction of width of a signal recording area 6 on the magnetic recording medium 5. In FIG. 1, another side 1b of the magnetoresistance element opposite to the side 1a is made equal in thickness and width to the side 1a. However, it is not always required to make the sides 1a and 1b equal in thickness and width to each other, but the thickness and width of the whole portion of the magnetoresistance element except an air bearing surface (that is, the side 1a) confronting the magnetic recording medium 5, may be increased to reduce the magnetic reluctance of the magnetoresistance element. Lead conductors (namely, lead wires) 2a and 2b are made of titanium. This is because the lead conductor 2a is exposed to the air bearing surface and it is required to make the lead conductor 2a of a corrosion-resisting material. In a case where the lead conductor 2a is not exposed to the air bearing surface, the lead conductors 2a and 2b can be made of a metal having low resistivity such as copper and molybdenum. The thickness and width of the lead conductors 2a and 2b are determined in accordance with a ratio of the current flowing through the side 1a of the magnetoresistance element to the current flowing through the lead conductor 2b. In the present embodiment, the lead conductor 2b forms a 1-turn coil. By increasing the number of turns of this coil, the current flowing through the lead conductor 2b can be reduced. Thus, the density of the current flowing through the side 1a of the magnetoresistance element can be increased, to increase the reproduced output. The lead conductor 2a is used for supplying a current to the side 1a of the magnetoresistance element, and the lead conductor 2b forms a coil around the side 1b of the magnetoresistance element to apply a bias magnetic field to the magnetoresistance element. A gap 3 prevents a current which is supplied to the lead conductor 2a, from flowing into the side 1b of the magnetoresistance element. It is desirable to make the length of the gap 3 as small as possible. However, in order to form the gap 3 surely, it is necessary to make the length of the gap 3 greater than 1,000 Å. While, in a case where the length of the gap 3 is made greater than 10,000 Å, the magnetic reluctance of the gap 3 is increased, and thus it becomes impossible to apply an appropriate bias magnetic field to the side 1a in the direction of easy axis. As a result, Barkhausen noise is readily generated. Hence, in the present embodiment, it is preferable to put the length of the gap 3 in a range from 1,000 to 10,000 Å. Even when the bias magnetic field is applied to the magnetoresistance element in the above-mentioned manner, a small magnetic domain may be generated in an edge portion of the magnetoresistance element. Even in a case where the magnetic domain is generated as mentioned above, the generation of Barkhausen noise can be prevented by making the width x of the lead conductor 2a greater than the width y of the side 1a of the magnetoresistance element.

In the present embodiment, a bias magnetic field may be applied to the magnetoresistance element in the direction of hard axis, to improve the linearity of read characteristics. In this case, it is necessary to form a shunt film on the side 1a of the magnetoresistance element, or to form a barber pole structure in the side 1a.

Figure 2:
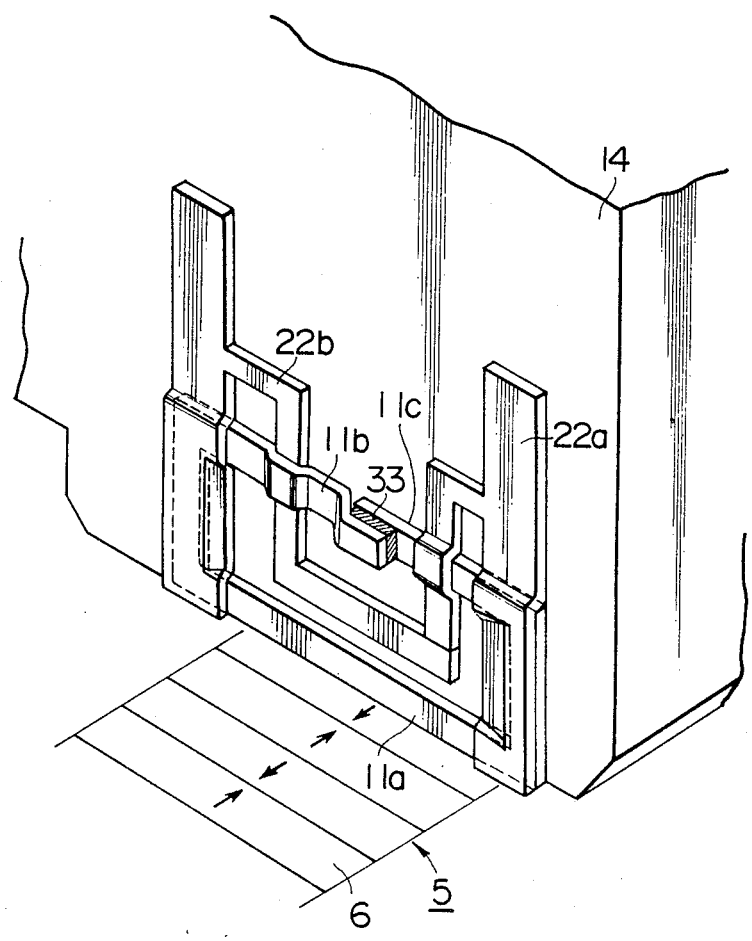
FIG. 2 is a schematic diagram showing another embodiment of a magnetic head according to the present invention.

FIG. 2 shows another embodiment of a magnetic head according to the present invention. Referring to FIG. 2, sides 11b and 11c of a magnetoresistance element which includes sides 11a, 11b and 11c to have the form of a loop, overlap each other through an insulating layer 33. The insulating layer 33 corresponds to the gap 3 of FIG. 1, and the thickness of the insulating layer 33 can be controlled more accurately than the length of the gap 3. Furthermore, the thickness of the insulating layer 33 can be made smaller than the length of the gap 3. In the present embodiment, the insulating layer 33 serving as a gap layer is made of $SiO_2$. It has been confirmed that an $SiO_2$ film having a thickness of 10Å or more is a uniform film free from a pin hole. Accordingly, in the present embodiment, the thickness of the insulating layer 33 can be reduced to 10 Å. Further, lead conductors 22a and 22b of the present embodiment perform the same function as the lead conductors 2a and 2b of FIG. 1, respectively. A slider 4, a magnetic recording medium 5 and a signal recording area 6 shown in FIG. 2 are identical with those of FIG. 1.

Figure 3:
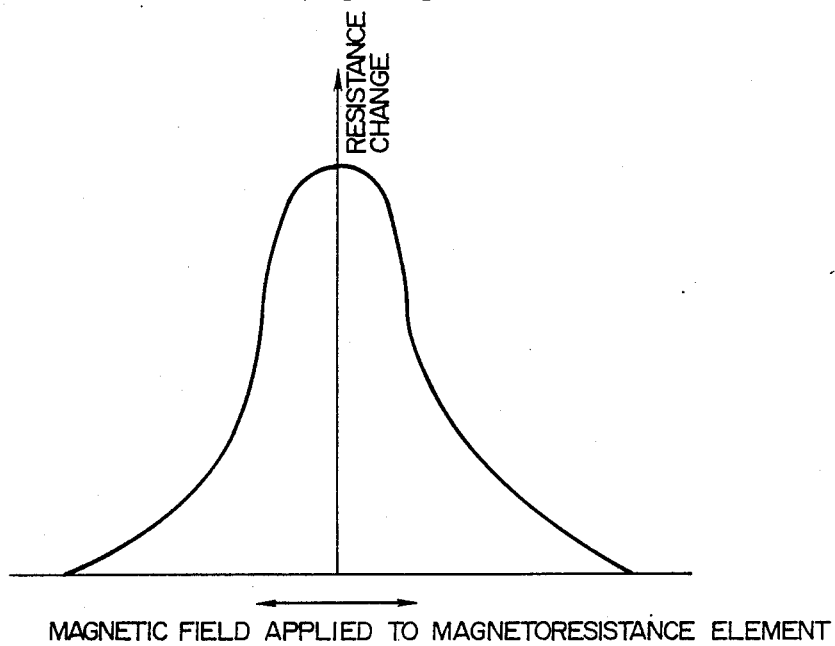
FIG. 3 is a graph showing the characteristic of a magnetic head according to the present invention, that is, a relationship between the magnetic field applied to a magnetoresistance element and the resistance change thereof.
Figure 4:
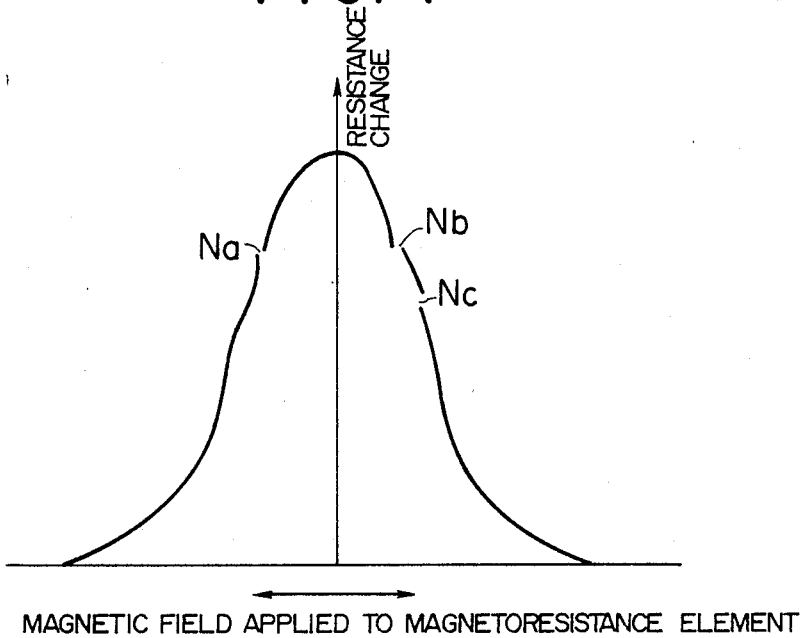
FIG. 4 is a graph showing the characteristic of a conventional magnetic head, that is, a relationship between the magnetic field applied to a magnetoresistance element and the resistance change thereof.

FIGS. 3 and 4 are graphs which show a improvement in read characteristics caused by applying a bias magnetic field to a magnetoresistance element in the direction of easy axis. FIG. 3 shows a relationship between the magnetic field applied to the magnetoresistance element and the resistance change thereof for a case where the bias magnetic field is applied to the magnetoresistance element, and FIG. 4 shows the above relationship for a case where no bias magnetic field is applied to the magnetoresistance element. As shown in FIGS. 3 and 4, it was confirmed by experiments that Barkhausen noise Na, Nb and Nc was eliminated by applying the bias magnetic field to the magnetoresistance element. In the above experiments, a ratio of the current flowing through the side 1a or 11a of the magnetoresistance element to the current flowing through the lead conductor 2a or 22a was made equal to five (5). In this case, as shown in FIGS. 3 and 4, the magnetic-field dependence of the resistance change of the magnetoresistance element was independent of the presence or absence of the bias magnetic field.

As has been explained in the foregoing, according to the present invention, there is provided a reproducing head which can be readily fabricated, and can realize a large output and high resolution without generating Barkhausen noise. This reproducing head can be used as the reproducing head of a magnetic tape apparatus, or the reproducing head of a magnetic disk apparatus provided with recording and reproducing heads.

We claim:

1. A magnetic head comprising:
 a magnetoresistance element having the form of a loop, a gap being formed in a first portion of the magnetoresistance element opposite to a second portion confronting a magnetic recording medium;
 a coil conductor formed around the first portion of the magnetoresistance element for applying a bias magnetic field to the second portion of the magnetoresistance element in the direction of width of a track on the magnetic recording medium; and
 a lead conductor for causing a current to flow through the second portion of the magnetoresistance element, the current being used for detecting a signal recorded in the magnetic recording medium, the lead conductor and the coil conductor being united in one body so that a part of a current supplied to the lead conductor flows through the coil conductor.

2. A magnetic head according to claim 1, wherein the magnitude of the gap lies in a range from 10 to 10,000 Å.

3. A magnetic head according to claim 1, wherein end portions of the magnetoresistance element overlap each other through an insulating material.

4. A magnetic head according to claim 1, wherein the width of the magnetoresistance element is made smaller than the width of the lead conductor lying on the magnetoresistance element.

5. A magnetic head according to claim 1, wherein a ratio of the current flowing through the second portion of the magnetoresistance element to the current flowing through the coil conductor is controlled by changing the width and thickness of the lead conductor.

* * * * *